(12) United States Patent
Ruebsamen et al.

(10) Patent No.: US 6,796,563 B2
(45) Date of Patent: Sep. 28, 2004

(54) HERMETIC SEAL FOR DEVICES WITH LIMITED ROTATION

(75) Inventors: Dale T. Ruebsamen, Glendale, AZ (US); Steve L. Hadden, Peoria, AZ (US); Toren S. Davis, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 6 days.

(21) Appl. No.: 10/302,502

(22) Filed: Nov. 22, 2002

(65) Prior Publication Data

US 2004/0100037 A1 May 27, 2004

(51) Int. Cl.[7] ................................................ F16J 15/52
(52) U.S. Cl. ........................ 277/636; 277/634; 277/391; 403/220
(58) Field of Search .................................... 277/391, 634, 277/636, 372, 393; 403/134, 220, 223

(56) References Cited

U.S. PATENT DOCUMENTS

| | | | | |
|---|---|---|---|---|
| 3,985,000 A | * | 10/1976 | Hartz | ............................ 464/99 |
| 4,043,564 A | * | 8/1977 | White | .......................... 277/636 |
| 4,991,457 A | * | 2/1991 | Chen | ........................ 74/473.36 |
| 5,046,745 A | * | 9/1991 | Sweetland et al. | ........... 277/634 |
| 5,439,311 A | * | 8/1995 | Hughes, Jr. | ................... 404/10 |

* cited by examiner

Primary Examiner—William L. Miller

(57) ABSTRACT

A hermetic seal (10) for a limited rotation device (12) includes a plurality of vertical convolutes (18) bonded to a device housing (16) at their respective first ends (19). At their respective second ends (21), plurality of the vertical convolutes (18) are bonded to a plurality of horizontal convolutes (20). The plurality of horizontal convolutes (20) are bonded to a device shaft (14) at an end opposite of the plurality of vertical convolutes (18). The plurality of vertical convolutes (18) stretch in order to provide limited rotation and the horizontal convolutes (20) expand or contract to accommodate length changes of the plurality of vertical convolutes (18). The hermetic seal (10) permits limited rotation while defining a barrier (26) and preventing viscous fluid leakage to an external environment.

11 Claims, 3 Drawing Sheets

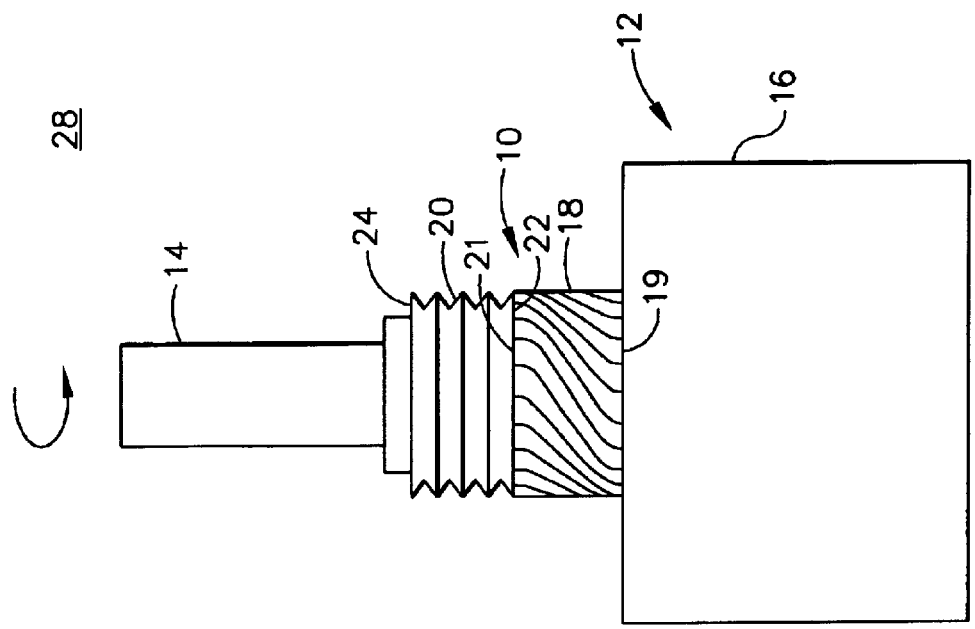
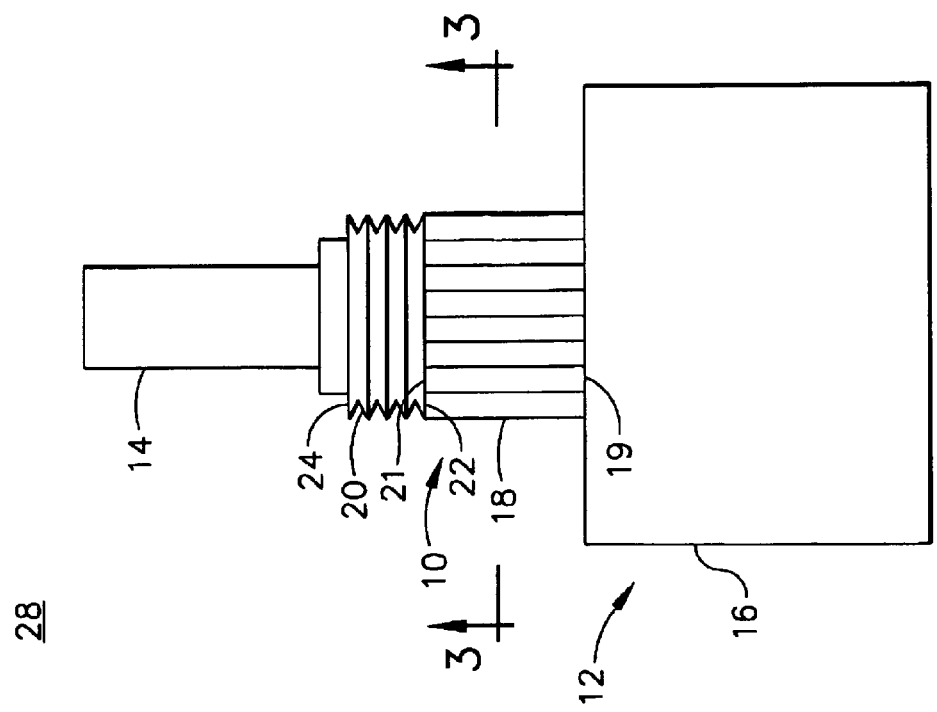

HERMETIC SEAL FOR DEVICES WITH LIMITED ROTATION

FIELD OF THE INVENTION

The present invention relates generally to seals for rotary devices, and more specifically, to a hermetic seal that permits limited rotation of a rotary device.

BACKGROUND OF THE INVENTION

A device with limited rotation such as a rotary damper has a propensity to leak viscous fluid from its shaft. A primary shaft seal is usually placed over the shaft in order to prevent this viscous fluid leakage. However, the primary shaft seal does not provide a perfect seal around a shaft of the rotary damper, and therefore small amounts of viscous fluid leak out to the external environment. This leaked fluid often is deposited on and causes damage to other instruments in the external environment. For example, with respect to a rotary damper for a space payload, such as a telescope, the leaked fluid may be deposited on optical instruments of the telescope, thereby blurring the output images.

In addition, in other rotary devices, such as vehicle motors, a clean vacuum environment around the rotary device is necessary for proper operation. Fluid or lubrication leakage from a shaft in the rotary device can damage or contaminate other items in the exterior environment.

Therefore, what is needed is a seal for a rotary device that prevents viscous fluid or lubricant (contaminants) from leaking and/or escaping to the external environment and that provides a clean environment around the rotary device.

SUMMARY OF THE INVENTION

In view of the above, the present invention provides a hermetic seal for devices with limited rotation. The hermetic seal includes a plurality of vertical convolutes and a plurality of horizontal convolutes. In a first embodiment, the vertical convolutes extend vertically from a device housing to the horizontal convolutes, which extend horizontally around the shaft. The vertical convolutes are bonded to the device housing, and the horizontal convolutes are bonded to the vertical convolutes and to the device shaft. The vertical convolutes stretch to permit limited rotation of the device shaft while still maintaining a barrier. The horizontal convolutes expand and contract to permit the vertical convolutes to fold upon themselves and to accommodate the length changes of the vertical convolutes. In a second embodiment, the horizontal convolutes are mounted to the device housing and the vertical convolutes. The vertical convolutes are mounted to the shaft and to the horizontal convolutes. In a third embodiment, the hermetic seal includes two sets of horizontal convolutes. One of the two sets of horizontal convolutes is mounted to the device housing and the other is mounted to the shaft. The vertical convolutes are mounted to both sets of horizontal convolutes and extend vertically from the first set of horizontal convolutes to the second set of horizontal convolutes.

The present invention consequently provides a hermetic seal for devices with limited rotation that prevents contaminant leakage to the exterior environment while defining a barrier between the device shaft and the device housing.

BRIEF DESCRIPTION OF THE DRAWINGS

Objects and advantages of the present invention will be more readily apparent from the following detailed description of the preferred embodiments thereof when taken together with the accompanying drawings in which:

FIG. 1 is an exemplary view of a hermetic seal according to a first embodiment of the present invention in use with a rotary damper;

FIG. 2 is an exemplary view of the hermetic seal shown in FIG. 1 during shaft rotation;

DETAILED DESCRIPTION OF THE PREFERRED EMBODIMENTS

Figure 3:
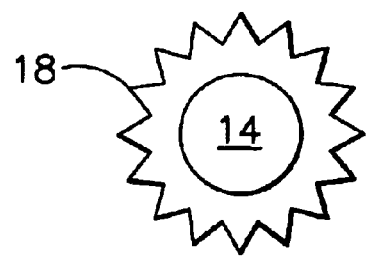
FIG. 3 is an exemplary view of a cross section of the hermetic seal shown in FIG. 1 along lines 3—3.

Referring now to the drawings in which like numerals reference like items, FIG. 1 shows a secondary redundant hermetic seal 10 (hermetic seal) according to a first embodiment of the present invention in use with a rotary device 12. The rotary device 12 shown is a rotary shear damper, which was disclosed in U.S. patent application Ser. No. 10/302,455 to Hadden et al., entitled "Rotary Shear Damper", the contents of which are incorporated herein by reference. The rotary device 12 includes a device shaft 14 and a device housing 16. However, the hermetic seal 10 is not limited to the rotary shear damper 12, as it may be used in any device that has limited shaft rotation and that requires a fluid-tight seal around the shaft.

The hermetic seal 10 includes a plurality of vertical convolutes 18 and a plurality of horizontal convolutes 20. The plurality of vertical convolutes (vertical convolutes) 18 are preferably made from silicon rubber or metal and are bonded, welded, or brazed at their respective first ends 19 to the device housing 16 and along each respective length portion to each other. The vertical convolutes 18 may be manufactured in a manner similar to convolutes for a standard bellows as known by those skilled in the art. The vertical convolutes 18 have a vertical length that, as will be more fully discussed below, is predetermined in accordance with a necessary shaft rotation. The vertical convolutes 18 extend vertically from the device housing 16 to the device shaft 14 and are preferably circularly arranged around the device shaft 14 in a star like configuration (FIG. 3). This configuration is for providing a barrier 26 (FIG. 4) between the vertical convolutes 18, the device housing 16, the device shaft 14 and an exterior environment, which is required to be free from contaminants in order to prevent contamination of the rotary device 12. The horizontal convolutes 20 may be manufactured in a manner similar to the convolutes of a bellows as known by those skilled in the art. The bonding may also be done by welding or brazing. The horizontal convolutes 20 extend circularly in a horizontal manner around the device shaft 14, have a top portion 24 bonded to the device shaft 14 and have a bellows configuration for expanding and contracting. A predetermined number of horizontal convolutes 20 are provided to accommodate length changes of the vertical convolutes 18 during operation. The manner for determining this predetermined number will be discussed more fully below.

Figure 4:
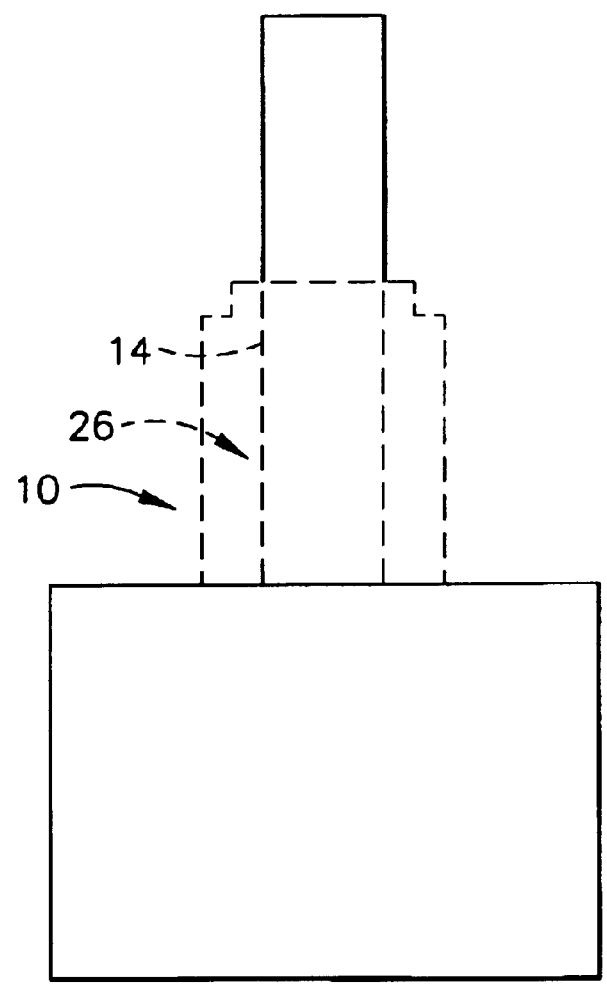
FIG. 4 is an illustration of the barrier defined by the hermetic seal shown in FIG. 1.

During operation of the rotary device 12, the device shaft 14 makes limited rotational movements for the purpose of, for example, providing a shear damping velocity or adjusting the positioning of the device shaft 14. These rotational movements are not infinite. Rather, these rotational movements are limited by the length of the vertical convolutes 18. For example, the length of the vertical convolutes 18 may permit five complete rotations (1 OT in radians) or more. Therefore, the vertical convolutes 18 must be able to accommodate these limited rotational movements while still maintaining the controlled environment or barrier 26 (FIG. 4).

Referring to FIG. 2, the behavior of the hermetic seal 10 during rotational movement is shown. The vertical convolutes 18 stretch axially during rotational movement to permit the device shaft 14 to rotate while maintaining the barrier 26. As shown in FIG. 2, the length of the vertical convolutes 18 extends and they begin to fold upon themselves. The increase and decrease of the length of the vertical convolutes 18 will be referred to as the stroke. The vertical convolutes 18 must have a vertical length that is sufficient for the desired rotation of the device shaft 14. The rotation of the device shaft 14 is related to the vertical length by formula (1):

$$\theta = (2 * \pi * L) / (\pi * d_i + N_c * t_c) \qquad (1)$$

$\theta$ refers to the shaft rotation in radians, L refers to the vertical length of the vertical convolutes 18, $N_c$ refers to the number of vertical convolutes 18, $t_c$ refers to the (average) thickness of each of the vertical convolutes 18, and $d_i$ refers to the inside diameter of the vertical convolutes 18, which can be no less than the outside diameter of the device shaft 14. A particular application of the hermetic seal 10 may require consideration of additional factors such as, for example, the material used for the vertical convolutes 18, the amount of bending at the top portions 21 and bottom portions 19 of each of the vertical convolutes 18, the amount by which each individual vertical convolute stretches when twisting around the device shaft 14, the shear at the portions in which the vertical convolutes are bonded to another portion such as the device shaft 14 and the total number of shaft rotations to be achieved, and the number of cycles that have to be achieved to meet the expected life.

The horizontal convolutes 20 accommodate the length changes of the vertical convolutes 18 during rotation of the device shaft 14. More specifically, as shown in FIG. 2, the bellows configuration of the horizontal convolutes 20 permits them to expand in order to accommodate the length changes of the vertical convolutes 20. This expansion of the horizontal convolutes 20 permits the vertical convolutes to fold on themselves while still maintaining the barrier 26. The horizontal convolutes 20 also contract when the vertical convolutes 18 return to their original dimensions as the device shaft 14 returns to its default position. The number of horizontal convolutes 20 must be sufficient enough to provide the necessary expansion consistent with the stroke requirement of the vertical convolutes 18. This number is determined based upon the stroke requirement of the vertical convolutes 18, the diameter of the bellows configuration, the thickness of the horizontal convolutes 20, and the fluid pressure among other parameters. However, at a minimum the number of horizontal convolutes 20 must be sufficient enough to provide an amount of stroke in the bellows configuration (horizontal stroke) in accordance with formula (2):

$$H_s = L - [(N_c * t_c) * (\theta / 2\pi)] \qquad (2)$$

$H_s$ refers to the stroke provided by the horizontal convolutes 20, L refers to the vertical length of the vertical convolutes 18, $N_c$ refers to the number of vertical convolutes 18, $t_c$ refers to the thickness of the vertical convolutes 18 and $\theta$ refers to the shaft rotation in radians.

For example, if the amount of shaft rotation was $\pi$ radians (180°), the horizontal stroke would have to be at least equal to the length of the vertical convolutes 18 minus half the total thickness of all the vertical convolutes 18.

Figure 5:
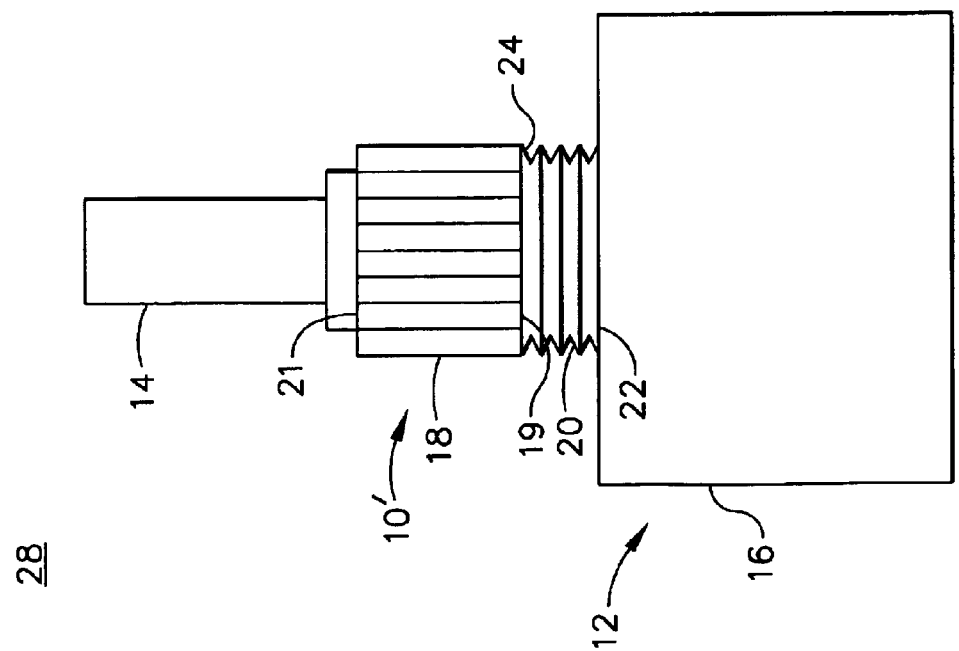
FIG. 5 is an exemplary view of the hermetic seal according to a second embodiment of the present invention.

Referring to FIG. 5, a hermetic seal 10' is shown according to a second embodiment of the present invention in which like numerals refer to like parts. In the second embodiment, the bottom portion 22 of the horizontal convolutes 20 is bonded to the device housing 16 and the top portion 24 of the horizontal convolutes 20 is bonded to the plurality of vertical convolutes 18. This configuration of the hermetic seal 10' of the second embodiment is essentially the reverse of that of the hermetic seal 10 of the first embodiment and can be made in a similar manner. However, operation and behavior will be essentially the same.

Figure 6:
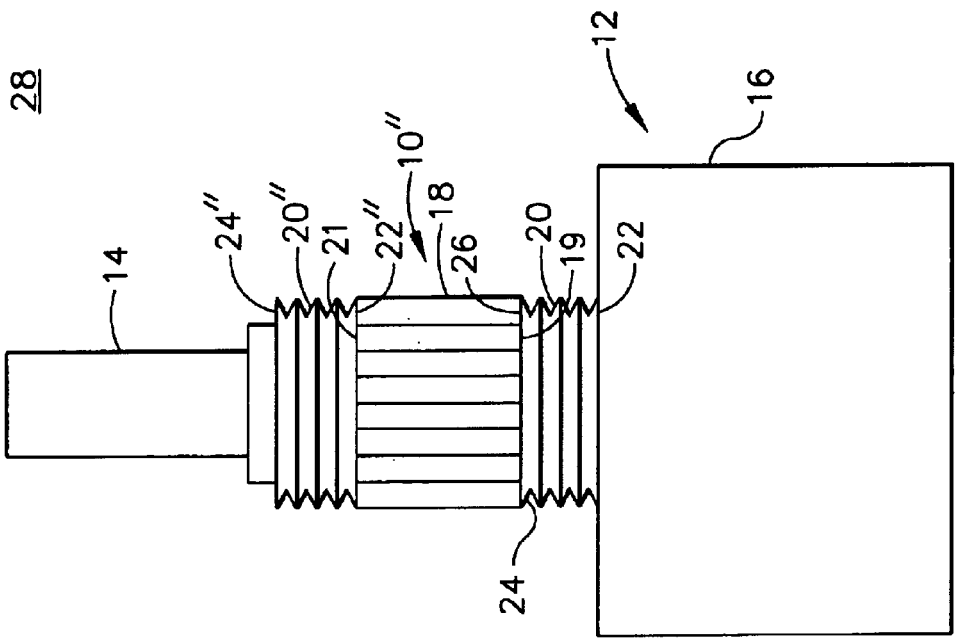
FIG. 6 is an exemplary view of the hermetic seal according to a third embodiment of the present invention.

Referring to FIG. 6, a hermetic seal 10" is shown according to a third embodiment of the present invention in which like numerals refer to like parts. The hermetic seal 10" includes a second plurality of horizontal convolutes 20". The second plurality of horizontal convolutes 20" has a top portion 24" bonded to the shaft 14 and a bottom portion 22" bonded to the second ends 21 of the vertical convolutes 18 in a manner similar to the first embodiment. A first plurality of horizontal convolutes 20 have the bottom portion 22 bonded to the device housing 16 and the top portion 26 bonded to the first ends 19 of the vertical convolutes 18 in a manner similar to the second embodiment. The addition of the second plurality of horizontal convolutes 20' provides further stroke in the bellows configuration for accommodating the vertical convolutes 18.

Therefore, the present invention provides a hermetic seal 10 for devices with limited rotation. The hermetic seal 10 includes a plurality of vertical convolutes 18 bonded to a device housing 16 at their respective first ends 19. Each of the plurality of vertical convolutes 18 has a predetermined length determined in accordance with the desired rotation of the device shaft 14. The hermetic seal 10 may also include a predetermined number of horizontal convolutes 20 bonded to the vertical convolutes 18 at one end portion and to either the device shaft 14 or the device housing 16 at the other end portion. The predetermined number of horizontal convolutes 20 is determined in accordance with a stroke requirement of the vertical convolutes 18. The plurality of vertical convolutes 18 and the predetermined number of horizontal convolutes 20 define a barrier 26 for preventing contaminant leakage to an environment exterior to the rotary device 12.

While the above description is of the preferred embodiment of the present invention, it should be appreciated that the invention may be modified, altered, or varied without deviating from the scope and fair meaning of the following claims. For example, the hermetic seal 10 could be provided without the horizontal convolutes 20. In this embodiment, the second ends 21 of the vertical convolutes 18 would be bonded to the device shaft 14 and the barrier 26 would be provided therein. Also, the vertical convolutes 18 could be provided around the device shaft 14 in a configuration different than the star-like configuration.

What is claimed is:

1. A hermetic seal for a limited rotation device comprising a plurality of vertical convolutes extending vertically from a device housing vicinity to a device shaft vicinity for preventing fluid leakage to an external environment for defining a barrier between the shaft and the housing and for permitting limited shaft rotation, the hermetic seal further comprising a plurality of horizontal convolutes extending horizontally around the device shaft for accommodating length changes of the plurality of vertical convolutes and for permitting further shaft rotation.

2. The hermetic seal of claim 1, wherein the plurality of vertical convolutes are comprised of a flexible material and each of the plurality of vertical convolutes has a first end bonded to the device housing.

3. The hermetic seal of claim 2, wherein the plurality of horizontal convolutes are comprised of the flexible material and have a top portion bonded to the device shaft and a bottom portion bonded to a second end of each of the plurality of vertical convolutes for permitting length change of the vertical convolutes during shaft rotation.

4. The hermetic seal of claim 2, wherein the plurality of horizontal convolutes have a bellows configuration that expands and contracts in order to accommodate the length changes of the plurality of vertical convolutes and for permitting further shaft rotation.

5. The hermetic seal of claim 2, wherein the plurality of horizontal convolutes are comprised of a flexible material and have a top portion bonded to a second end of each of the plurality of vertical convolutes and a bottom portion bonded to the device housing.

6. The hermetic seal of claim 1, wherein a vertical length of each of the plurality of vertical convolutes is related to a shaft rotation by a formula that follows:

$$\theta = (2 * \pi * L) / (\pi * d_i + N_c * t_c)$$

wherein $\theta$ refers to the shaft rotation in radians, L refers to a vertical length of each of the plurality of vertical convolutes, $N_c$ refers to a total number of the plurality of vertical convolutes, $t_c$ refers to an average thickness of each of the plurality of vertical convolutes, and $d_i$ refers to an inside diameter of the plurality of vertical convolutes.

7. The hermetic seal of claim 6, wherein a total number of the plurality of horizontal convolutes is determined in accordance with a stroke requirement of the plurality of vertical convolutes.

8. The hermetic seal of claim 1, wherein the plurality of vertical convolutes is arranged around the device shaft in a circular configuration for permitting limited shaft rotation.

9. A hermetic seal for a device with limited rotation comprising:

a plurality of vertical convolutes, each having a first end bonded either directly or indirectly to a device housing and a second end bonded either directly or indirectly to a device shaft; and a plurality of horizontal convolutes in structural communication with the plurality of vertical convolutes for accommodating length changes of the plurality of vertical convolutes;

wherein the plurality of vertical convolutes and the plurality of horizontal convolutes are for defining a barrier therein and for preventing fluid leakage to an exterior environment.

10. The hermetic seal of claim 9, wherein the plurality of vertical convolutes extend axially for accommodating limited rotational movements of the device shaft, and the plurality of horizontal convolutes expand and contract for accommodating length changes of the plurality of vertical convolutes.

11. The hermetic seal of claim 9, wherein the plurality of vertical convolutes and the plurality of horizontal convolutes are made from one of silicon rubber, plastic and stainless steel.

* * * * *